United States Patent Office 3,832,268
Patented Aug. 27, 1974

3,832,268
REINFORCED PLASTIC STRUCTURES CONTAINING CURED POLYESTER RESIN
Clarence R. Smith, Penndel, Pa., assignor to Rohm and Haas Company, Philadelphia, Pa.
No Drawing. Continuation-in-part of abandoned application Ser. No. 218,463, Jan. 17, 1972. This application Apr. 17, 1972, Ser. No. 244,892
Int. Cl. B32b 5/16, 17/04, 27/08
U.S. Cl. 161—162                3 Claims

ABSTRACT OF THE DISCLOSURE

Reinforced plastic structures are formed from thermoplastic substrates having bonded thereto a cured polyester of a composition comprising an ethylenically unsaturated curable polyester and a monomer mixture of a copolymerizable unsaturated carboxylic acid or anhydride and a different copolymerizable monomer. The plastic structures are characterized by improved bonding between the substrate and cured polyester.

---

This application is a continuation-in-part of my earlier filed application, Ser. No. 218,463 of Jan. 17, 1972, and now abandoned.

This invention is concerned with a curable resinous composition which upon curing exhibits improved adhesion to thermoplastic substrates. The invention also relates to a polyester which upon curing forms compositions useful for increasing the rigidity of thermoplastic structures. The polyester may contain fibers or glass particles and may be used to form structures, such as those described by Wimmer, U.S. Pat. 3,356,253, issued Dec. 5, 1967 and by Stayner, U.S. Pat. 3,582,388 issued June 1, 1971.

The compositions of the present invention may be used in the manufacture of products where the aesthetic and functional qualities of the thermoplastic sheet are desired and the rigidity and strength of glass fiber reinforced polyester are necessary to obtain adequate mechanical performance. Some of the advantages of such products over metals include light weight, high strength to weight ratio, resistance to corrosion, and part design flexibility. The compositions of the present invention find particular usefulness for forming articles sold in the sanitary ware market such as basins, sinks, shower stalls, bathtubs, etc.

A significant disadvantage of prior art products is that it is difficult to satisfactorily bond the polyester to the thermoplastic substrate, particularly to crosslinked acrylic sheet. The present invention represents a significant advance to the art in that it provides a resinous composition which when cured exhibits improved adhesion to thermoplastic substrates. The polymerizable polyester of this invention is described as comprising: (A) 20 to 80 weight percent of an ethylenically unsaturated curable polyester of an α,β-ethylenically unsaturated dicarboxylic acid and a polyhydric alcohol, and (B) 80 to 20 weight percent of a monomer mixture of a copolymerizable unsaturated carboxylic acid, or anhydride, and a different copolymerizable monomer containing a $CH_2=C<$ group. The reinforced plastic structure of the present invention comprises a cured polyester of the composition described above, containing glass particles or fibers distributed throughout the polyester and the polyester bonded to a cast or extruded thermoplastic resin, the structure characterized by improved bonding between the polyester and the thermoplastic resin.

The ethylenically unsaturated curable polyesters useful in the present invention are the polycondensation products of an α,β-ethylenically unsaturated dicarboxylic acid and a polyhydric, preferably a dihydric, alcohol. The polyester is used in amounts ranging from 20 to 80 percent by weight of the total component resinous system, and preferably in amounts ranging from 50 to 70 percent by weight. The class of unsaturated polyesters in itself is not unique and methods of preparing them are well known. Such polyesters may be prepared by condensing an α,β-ethylenically unsaturated dicarboxylic acid or anhydride or mixtures thereof with a dihydric alcohol or mixtures of dihydric alcohols. (The term dicarboxylic acid is intended to include anhydrides of the acids which form anhydrides.) Preferred examples of unsaturated dicarboxylic acids which may be used are maleic or fumaric acids; however, citraconic, chloromaleic acids and the like may have value in certain instances. Up to 75 mole percent of the unsaturated acid can be replaced by saturated dicarboxylic acids, examples of which are orthophthalic, isophthalic, terephthalic, succinic, adipic, sebacic, methylsuccinc acids and the like. Preferably, about 30 to 70 mole percent is replaced.

Dihydric alcohols that are useful in preparing the polyesters include ethylene glycol, 1,2-propanediol (hereinafter referred to as propylene glycol), dipropylene glycol, diethylene glycol, 1,3-butanediol, and the like. Examples of suitable unsaturated polyesters are the polycondensation products of (1) propylene glycol with maleic or fumaric acids with isophthalic or phthalic acids; (2) 1,3-butanediol and the above acids; (3) combinations of ethylene and propylene glycols (50 mole percent or less of ethylene glycol) with the above acids; (4) combinations of propylene glycol and of dipropylene glycol or dipropylene alone with the above acids; and (5) diethylene glycol and the above acids. These examples are intended to be illustrative of suitable polyesters and are not intended to be all-inclusive.

In addition to the curable polyester, the polymerizable composition of this invention additionally comprises a mixture of monomers. This monomer mixture comprises 20 to 80 percent by weight of the composition, preferably 30 to 50 weight percent. The monomer mixture comprises a copolymerizable unsaturated carboxylic acid or anhydride and a different copolymerizable monomer containing a $CH_2=C<$ group.

Suitable carboxylic acid or anhydride monomers include acrylic, methacrylic, itaconic, fumaric, maleic, citraconic, α-methylene glutaric, aconitic, methylene malonic, mesaconic acids and substituted acrylic acids such as α-hydroxymethyl- or α-halomethyl acrylic acids as well as acids such as methacryloxypropionic acid, acryloxy- or methacryloxy-isopropyl acid phthalate, acryloxy- or methacryloxy-ethyl or isopropyl acid oxalate, maelate, succinate, glutrate, and the like. The polymerizable composition of this invention may contain 1 to 25 weight percent, preferably 2 to 20 weight percent, of the carboxylic acid monomers. The preferred monomers are methacrylic acid and maleic anhydride.

The third essential constituent of the composition of the present invention is a copolymerizable monomer other than the acid or anhydride previously described and containing at least one $CH_2=C<$ group per molecule. These monomers should be liquid under conditions of use of the resin. The monomeric liquid substance must be copolymerizable with the unsaturated polyester, the acid or anhydride or a mixture of polyester and acid or anhydride over a wide range of concentrations. Examples are styrene, vinyl acetate, vinyl toluene, tertiary butyl styrene and chlorostyrene, either as the sole monomer or in combination with minor amounts (50 percent by weight) of other monomer substances such as lower alkyl esters of acrylic or methacrylic acids, 1,3-butanediol dimethacrylate, diallyl phthalate, and the like.

The monomer liquid is used in amounts ranging from about 10 to 79 percent by weight of the total three component composition preferably at least 10 percent and most preferably between 15 and 48 percent by weight. With some compositions, the range of 29 to 49 is preferred.

Polymerization inhibitors and accelerators, and particulate fillers including glass spheres are optionally added to the compositions to perform their normal function, as is well understood in the art.

The reinforced plastic structures of this invention comprise the cured polyester resin described above containing finely divided glass paticles or fibers distributed therethrough and bonded to a cast or extruded thermoplastic sheet. Suitable thermoplastic resins include vinyl chloride resins, acrylonitrile/butadiene/styrene resins (ABS), acrylic resins and polycarbonates such as those described in the Wimmer and Stayner patents, identified above, or in Niederhauser et al., U.S. Ser. No. 760,066, filed Sept. 16, 1968, and now abandoned, Hudson, U.S. Pat. 3,069,287, issued Dec. 18, 1962 and Souder et al., U.S. Pat. 3,251,904, issued May 17, 1966.

To assist those skilled in the art in the practice of the present invention, the following modes of operation are set forth as illustrations, parts and percentages being by weight unless otherwise specifically noted.

EXAMPLE 1 a. A three-component resinous composition IV is prepared from the following: An unsaturated polyester, herein designated as (I) (prepared by esterifying 2.1 moles of propylene glycol with 1.0 mole of maleic anhydride and 1.0 mole of orthophthalic anhydride to an acid number of 45), methacrylic acid monomer designated as (II) and styrene monomer (III). The components are blended to yield a clear liquid resinous composition (IV) of the following overall composition:

|  | Parts |
|---|---|
| Unsaturated polyester (I) | 60 |
| Methacrylic acid (II) | 5 |
| Styrene (III) | 35 |

To composition IV is added 0.675 parts cobalt naphthenate as accelerator and 0.7 parts methyl ethyl ketone peroxide as catalyst.

b. An acrylic sheet of poly(methyl methacrylate) is vacuum formed and coated by means of a spray gun with polyester composition IV and glass fibers having an average length of about one inch. The resin is sprayed through the gun simultaneously with the glass fibers. The polyester resin-glass formulation gelled in about 30 minutes at room temperature. The resulting laminated article is exceptionally strong, durable and of improved resistance to delamination as compared to an article prepared from a resin-glass formulation wherein the resin contained 60 parts polyester, 40 styrene and no methacrylic acid.

EXAMPLE 2

An unsaturated polyester (I) as in Example 1 was used in the preparation of the following resins. A polyester resin (V) was prepared by blending 60 parts of polyester (I) with 40 parts of styrene monomer. A polyester resin (VI) was prepared by blending 60 parts of polyester (I) with 30 parts of styrene monomer and 10 parts of maleic anhydride. Both resins contained inhibitors as is common in the art.

Resins suitable for hand lay-up or spray-up were formulated as follows:

| Formulation | Parts A | B |
|---|---|---|
| Polyester resiv V | 100 | |
| Polyester resin VI | | 100 |
| Cobalt naphthenate (6% Co) | 0.675 | 0.675 |
| Methyl ethyl ketone peroxide | 0.7 | 0.7 |

Glass fiber mat lay-ups were made against lightly crosslinked acrylic sheet using Formulations A and B. The acrylic sheets were 6 inches square and 0.080 inches thick, 50 grams of resin were used to impregnate 5 inch square pieces of 2 ounce per square feet chopped strand glass mat placed against the acrylic sheets. Formulation A gelled in 51 minutes and Formulation B gelled in 43 minutes at 25° C. After 24 hours aging at 25° C., ¾ inch wide strips were cut from the composites and adhesion of the glass reinforced polyester layer to the acrylic sheet determined. In the case of Formulation A (based on resin V) the layer could be separated easily at the interface and a clean delamination resulted. Separation of the acrylic sheet from the glass reinforced polyester layer of the composite made with Formulation B (based on resin VI) could be affected only with great difficulty and failure occurred in the polyester layer, leaving large pieces of the laminate attached to the acrylic sheet, evidence of greatly improved adhesion of resin VI, which is illustrative of this invention.

What is claimed is:

1. A reinforced plastic structure comprising the cured polymerizable composition comprising (a) 20 to 80 weight percent of an ethylenically unsaturated curable polyester which is the esterification product of a polyhydric alcohol, and $\alpha,\beta$-ethylenically unsaturated dicarboxylic acid or anhydride, and about 0 to 75 mole percent of a saturated dicarboxylic acid or anhydride based on total acid and anhydride present; and (b) 80 to 20 weight percent of a monomer mixture of about 1 to 25 weight percent of a copolymerizable unsaturated carboxylic acid or anhydride monomer selected from the group consisting of maleic anhydride and methacrylic acid, and about 10 to 79 weight percent of styrene containing finely divided glass particles or fibers distributed throughout said polyester, and said polyester resin bonded to a cast or extruded thermoplastic sheet, the structure characterized by impoved bonding between the cured polyester resin and the thermoplastic sheet.

2. The structure of Claim 1 wherein the thermoplastic sheet is comprised of a polymer selected from the group consisting of polyvinyl chloride, acrylonitrile-butadiene-styrene copolymer, acrylic resins, and polycarbonates.

3. The structure of Claim 2 wherein the thermoplastic sheet is an acrylic resin.

References Cited

UNITED STATES PATENTS

| | | | |
|---|---|---|---|
| 3,720,540 | 3/1973 | Wimmer | 161—231 X |
| 3,160,679 | 12/1964 | Lew | 260—861 |
| 3,176,050 | 3/1965 | Jen et al. | 260—861 |
| 3,356,253 | 12/1967 | Wimmer | 156—196 X |
| 3,535,404 | 10/1970 | Barie et al. | 260—861 X |
| 3,582,388 | 6/1971 | Stayner | 117—138.8 UA |
| 3,516,455 | 6/1970 | Taft | 260—861 X |

CHARLES E. VAN HORN, Primary Examiner

U.S. Cl. X.R.

117—138.8 A, 138.8 F, 138.8 UA; 161—183, 231, 253, 255, 168, 170; 260—861